United States Patent [19]

Coddington

[11] Patent Number: 5,394,407
[45] Date of Patent: Feb. 28, 1995

[54] METHOD OF TRANSFERRING ERROR CORRECTING CODE AND CIRCUIT THEREFOR

[75] Inventor: John D. Coddington, Austin, Tex.

[73] Assignee: Motorola, Inc., Schaumburg, Ill.

[21] Appl. No.: 84,118

[22] Filed: Jul. 1, 1993

[51] Int. Cl.[6] .................. G06F 11/10; H03M 13/00; H04L 1/18
[52] U.S. Cl. .................................. 371/37.1; 371/37.5
[58] Field of Search ...................... 371/37.1, 41, 40.1, 371/42, 35

[56] References Cited

U.S. PATENT DOCUMENTS 5,271,020 12/1993 Mavisetty .......................... 371/30

Primary Examiner—Roy N. Envall, Jr.
Assistant Examiner—Emmanuel L. Moise
Attorney, Agent, or Firm—Lee E. Chastain

[57] ABSTRACT

A method of transferring error correcting code has the steps of receiving a first data stream in a data processing system, generating a second data stream, and generating a correctable error signal. Initially, the data processing system outputs the first data stream. Later, the data processing system may select the second data stream to output responsive to a first predetermined transition of the correctable error signal. The second data stream and the correctable error signal are generated from the first data stream pursuant to an error correcting code protocol. The disclosed method permits high speed pipelined data processor operation.

3 Claims, 3 Drawing Sheets

METHOD OF TRANSFERRING ERROR CORRECTING CODE AND CIRCUIT THEREFOR

FIELD OF THE INVENTION

The present invention generally relates to digital computing systems, and more specifically to a data processor using an error correcting code protocol.

BACKGROUND OF THE INVENTION

Certain data processors store data using error correcting codes (hereafter simply ECCs). A data processor using an ECC generates a symbol each time the data processor stores data in an associated memory system. Each symbol contains a first and a second subset of bits. The first subset of bits form the data byte, half-word, word, etc. desired to be stored by the data processor. The second subset of bits are generated by the data processor and are a predetermined function of the first subset of bits. When the data processor needs a particular data word, half-word, word, etc., it retrieves the symbol whose first subset of bits is the desired data word, half-word, word, etc. The data processor extracts the first subset of bits from the retrieved symbol, generates a second subset of bits using the same predetermined function, and combines the two subsets to form a new symbol. The data processor then compares the retrieved symbol and the new symbol. The differences between the two symbols indicate if a data storage error occurred.

ECC protocols are characterized by the number of bit errors each is able to correct and the number of bit errors each is able to detect. For instance, a particular ECC protocol may be a single bit correcting-double bit detecting protocol. This protocol can detect and correct any single bit reversal within the symbol that occurs between the time of symbol storage and the time of symbol retrieval. This protocol can also detect if any two bits within the symbol flip logic states, though it cannot correct the error. The symbol is discarded when it is known to contain an error but is not susceptible to correction. This exemplary protocol cannot detect if three or more bits flip logic states. The size of the second subset of bits relative to the first subset of bits determines the number of detectable and correctable bits for each ECC protocol. The greater the number of bits within the second subset, the greater is the range of errors that the protocol can detect and correct. Generally, a particular protocol is selected so that the likelihood of undetectable errors is sufficiently small but the increase in memory storage requirements for the second subset of bits is manageably small.

Known data processing systems that use ECC protocols face a design compromise. These systems either (1) delay transmission of the data to the ultimate data user until the ECC protocol is performed or (2) immediately use the data before it is completely processed pursuant to the ECC protocol. In the first case, an extra cycle delay is introduced into the data path. Oftentimes the data input/output path is already a critical speed path in a data processing system. This extra delay only worsens the critical speed path. Furthermore, data errors of the type targeted by ECC protocols are relatively rare events. Therefore, the first case is a slow solution optimized for the infrequent case. In the second case, the data processor assumes the data it receives is correct, as is normally the case. However, the data processor must be designed with complex subsystems that may "undo" the acts caused by bad data when it is received. For instance, a reversed bit will change the meaning of a fetched instruction or its operand. The execution of this instruction will not produce the intended result. The data error may be compounded if the incorrect instruction is a branch instruction or should have been a branch instruction and was incorrectly modified. In these instances, the data processing system will begin executing instructions along a second incorrect instruction thread. Such a data processing system may proceed with the correct data only after it has restored its state to the state existing immediately before the data processing system received the bad data. Therefore, the second case is an expensive solution optimized for the frequent case.

SUMMARY OF THE INVENTION

In accordance with the present invention, there is disclosed a method of transferring error correcting code which substantially eliminates disadvantages of prior data transfer methods.

The method of transferring error correcting code has the steps of receiving a first data stream in a data processing system, generating a second data stream, and generating a correctable error signal. Initially, the data processor outputs the first data stream. Later, the data processor may select the second data stream to output responsive to a first predetermined transition of the correctable error signal. The second data stream and the correctable error signal are generated from the first data stream pursuant to an error correcting code protocol.

In addition, a circuit for use in a data processing system is described. The circuit has error correcting circuitry, control circuitry and switching circuitry. The error correcting code circuitry receives a first data stream and generates a second data stream and a correctable error signal. The error correcting code circuitry generates the second data stream responsive to the first data stream and to an error correcting code protocol. The error correcting code circuitry places the correctable error signal in a first logic state responsive to an error in the first data stream. The control circuitry receives the correctable error signal and a data valid signal and generates a select signal. The control circuitry places the select signal in a first logic state responsive to a first predetermined logic state transition of the data valid signal and places the select signal in a second logic state responsive to a second predetermined logic state transition of the correctable error signal. The switching circuitry receives the select signal, the first data stream and the second data stream. The switching circuitry outputs the first data stream responsive to a first logic state of the select signal and the second data stream responsive to a second logic state of the select signal.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION OF A PREFERRED EMBODIMENT

Figure 1:
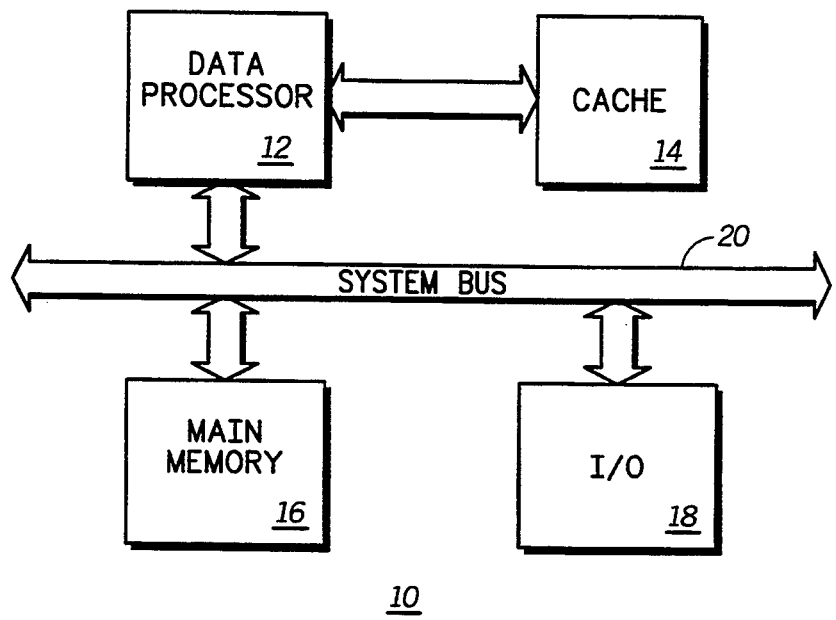
FIG. 1 depicts a block diagram of a data processing system constructed in accordance with the present invention.

FIG. 1 depicts a block diagram of a data processing system 10 constructed in accordance with the present invention. Data processing system 10 has a data processor block 12, an external memory cache block 14, a main memory block 16 and an input/output block 18 (labeled I/O). As depicted, data processor 12, main memory 16 and I/O 18 are connected through a system bus 20. Data processor 12 is also connected directly to memory cache 14. Data processing system 10 is a member of a class of devices that use error correcting code protocols (hereafter ECCs) to ensure the security of data used by the system. As will be described below, data processing system 10 forwards a data stream stored within it when requested to do so, checks and corrects the data stream as it reads the data, and forwards either the read data during a first clock cycle to data processor block 12 or forwards the corrected during the immediately subsequent clock cycle. The method allows data read instructions to be both pipelined and checked for errors pursuant to an ECC protocol.

The operation of the blocks depicted in FIG. 1 is known in the art except as described below in connection with FIGS. 2 through 4. Generally, data processor 12 executes an instruction stream stored in main memory block 16. External cache block 14 stores a subset of the data stored in main memory block 14 that is used frequently by data processor block 12. Data processor block 12 periodically refreshes the contents of external cache block 14 as appropriate to its operations and to any memory coherency protocol data processing system 10 may follow. Data processor block 12 may include an internal cache instead of external cache block 14 or in addition to external cache block 14. Input/output block 18 communicates to other devices (not depicted) on behalf of data processing system 10. Input/output block 18 may include, for instance, a keyboard, a video terminal controller, etc. As described above, data processor 12 reads data stored in either type of cache or in main memory block 18 and processes the data pursuant to an ECC protocol.

Figure 2:
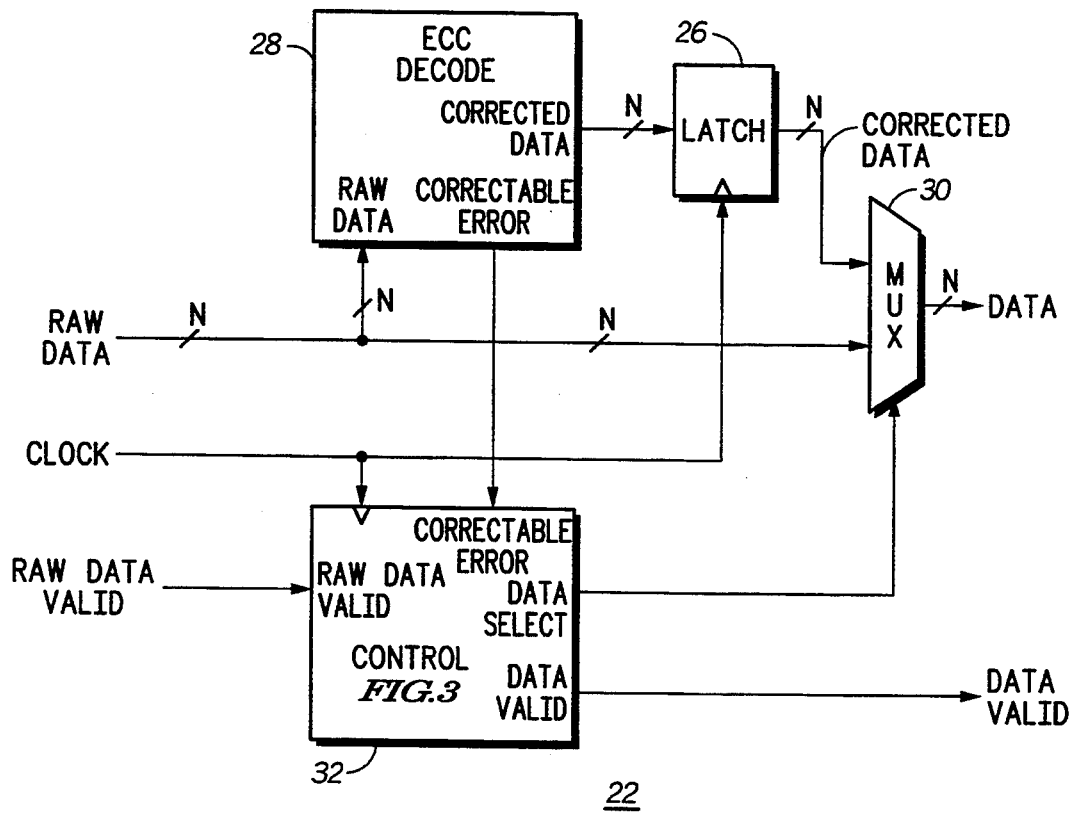
FIG. 2 depicts a block diagram of a portion of a memory management unit incorporated in the data processor block depicted in FIG. 1.

FIG. 2 depicts a block diagram of a portion of a memory management unit 22 (hereafter simply MMU) incorporated in the data processor block 12 depicted in FIG. 1. MMU 22 performs certain functions within data processor block 12 related to memory store and memory load operations. In addition, MMU 22 may control the operation of an external or internal cache associated with data processor block 12.

MMU 22 receives an N-bit wide input data stream (labeled RAW DATA), a periodic clocking signal (labeled CLOCK), and an input data valid signal (labeled RAW DATA VALID), where N is an integer. Typically, MMU 22 receives several N-bit wide data groups in sequence. MMU 22 may receive one N-bit data group during each cycle of the periodic clock signal, CLOCK. The input data valid signal indicates that the input data stream is valid data sent from a data storage device as opposed to data bus noise. It is asserted or de-asserted during each clock cycle for each group of N-bits. The input data stream may contain errors created during data storage or retrieval. The input data valid signal does not reflect these errors.

MMU 22 generates an N-bit wide output data stream (labeled DATA) and an output data valid signal (labeled DATA VALID). The output data signal may contain data from the input data stream, data generated by MMU 22 pursuant to an ECC protocol, or both. The mix of data present in the output data stream signal depends upon whether the input data stream contains an error as defined by the relevant ECC protocol and upon when the error occurs in a data read operation. Typically, the N-bit wide output data stream contains several N-bit wide data groups output in sequence. MMU 22 outputs one of the N-bit wide data groups during one cycle of the periodic clock signal, CLOCK. The output data valid signal indicates when the output data is valid data sent from a data storage device and when the output data stream contains no errors. It is asserted or de-asserted during each clock cycle for each group of N-bits.

The portion of MMU 22 depicted in FIG. 2 includes a latch 26, an ECC decode block 28, a multiplexer 30 (labeled MUX), and a control block 32. Multiplexer 30 outputs one of two data streams as the data output stream responsive to a control signal, DATA SELECT, generated by control block 32. The first data stream is labeled RAW DATA. The second data stream is generated by the output of latch 26. Latch 26 receives the data stream signal generated by ECC decode block 28 (labeled CORRECTED DATA) and latches the signal concurrent with the predetermined one of the edges of the clock signal.

ECC decode block 28 receives the input data stream and processes each N-bits of data pursuant to an ECC protocol. If the N-bits of data are not correct, then ECC decode block 28 will attempt to correct the data in the following clock cycle. For instance, if ECC decode block implements a single bit correcting-double bit detecting protocol, then it will correct each group of N-bits that contain a single bit error. The corrected data is output to latch 26 one clock cycle after ECC decode block 28 receives the incorrect data. ECC decode block 28 will assert the control signal, CORRECTABLE ERROR, to control block 32 when ECC decode block 28 receives an incorrect group of N data bits. In another embodiment of the disclosed invention, ECC decode block 28 may generate a detected error signal. ECC decode block 28 would assert this signal when it detects an error in the RAW DATA stream, independent of whether it corrects the error.

It should be understood that each N-bits of data make one of the symbols described above in the Background of the Invention. Each symbol contains the first and the second subset of bits. The first subset of bits form the data byte, half-word, word, etc. stored by the data processor. The second data bits are generated by the data processor and are a predetermined function of the first subset of bits. ECC decode block 28 extracts the first subset of bits from the N-bits input to MMU 22 and generates the second subset. ECC decode block 28 then combines the two subsets and compares the new symbol with the input N-bits, the original symbol. A difference between the two symbols indicates a storage error in either subset of bits. ECC protocols and their implementation are known in the art.

In the preferred embodiment, N equals one hundred and thirty-seven. The first subset of bits, those associated with a data quad-word, contain one hundred and twenty-eight bits. The second subset of bits, those associated with a Modified Hamming ECC protocol, contain nine data bits. A Modified Hamming code can detect double-bit errors and correct single-bit errors. In one implementation of the disclosed invention, the data quad-word described above is associated with a data quad-word stored in an external, secondary cache. In this implementation, twenty-eight bits identify the address of the quad-word within main memory block 16 and constitute a first subset of bits of a second symbol. The second subset of bits of the second symbol has six bits. The second symbol is also generated according to a Modified Hamming Code. The second symbol is processed in parallel with the first symbol by a parallel circuit (not shown) within MMU 22. In this manner, both the cached data and its cached address tag may be known with confidence. The cached data quad-word and cached address tag are checked each time the two are loaded into an internal primary cache from the external secondary cache.

Control block 32 generates the data select signal and the output data valid signal. The data select signal selects which one of the two data streams multiplexer 30 outputs: CORRECTED DATA or RAW DATA. The output data valid signal indicates that the data output by MMU 22 is correct and valid.

Control block 32 forces the data select signal to a first predetermined logic state upon the rising edge of the input data valid signal. The input data valid signal is asserted by the data storage system (depicted in FIG. 1) once the data storage system begins providing the requested data to MMU 22. Control block 32 forces the data select signal to a second predetermined logic state upon the rising edge of the correctable error signal. The first and second predetermined logic states of the data select signal cause multiplexer 30 to output the RAW DATA and CORRECTED DATA data streams, respectively.

Control block 32 asserts the output data valid signal coincident with the assertion of the input data valid signal. Control block 32 may de-assert the output data valid signal depending upon the correctable error signal. If ECC decode block 28 corrects an error and asserts the correctable error signal, then control block 32 will de-assert the output data valid signal. If ECC decode block 28 does not assert the correctable error signal, then control block 32 will continue to assert the output data valid signal. As described above, ECC decode block 28 generates the correct N-bit data byte, half-word, word, etc. and de-asserts the correctable error signal one clock cycle after MMU 22 receives the incorrect N-bit data byte, half-word, word, etc. Therefore, control block 32 may re-assert the output data valid signal in the following clock cycle. Control block 32 will not de-assert the output data valid signal a second time should ECC decode block 28 assert the correctable error signal a second time.

In the other embodiment described above in connection with ECC decode block 28, control block 32 would ignore any assertion of the detected error signal that was accompanied by a correctable error signal. Control block 32 would pass to the data valid signal an assertion of the detected error signal that was not accompanied by a correctable error signal.

At the end of the read operation, an external circuit (not shown) will de-assert the input data valid signal. Control block 32 then re-selects the RAW DATA data stream. This protocol ensures that data processor block 12 receives all requested data and in the requested data's proper order after the occurrence of a correctable error. Any correctable errors in the data stream subsequent to the first correctable error will automatically be corrected by ECC decode block 28 and will be output by multiplexer 30 until the input data valid signal is toggled. Control block 32 is more fully described below in connection with FIG. 3.

Figure 3:
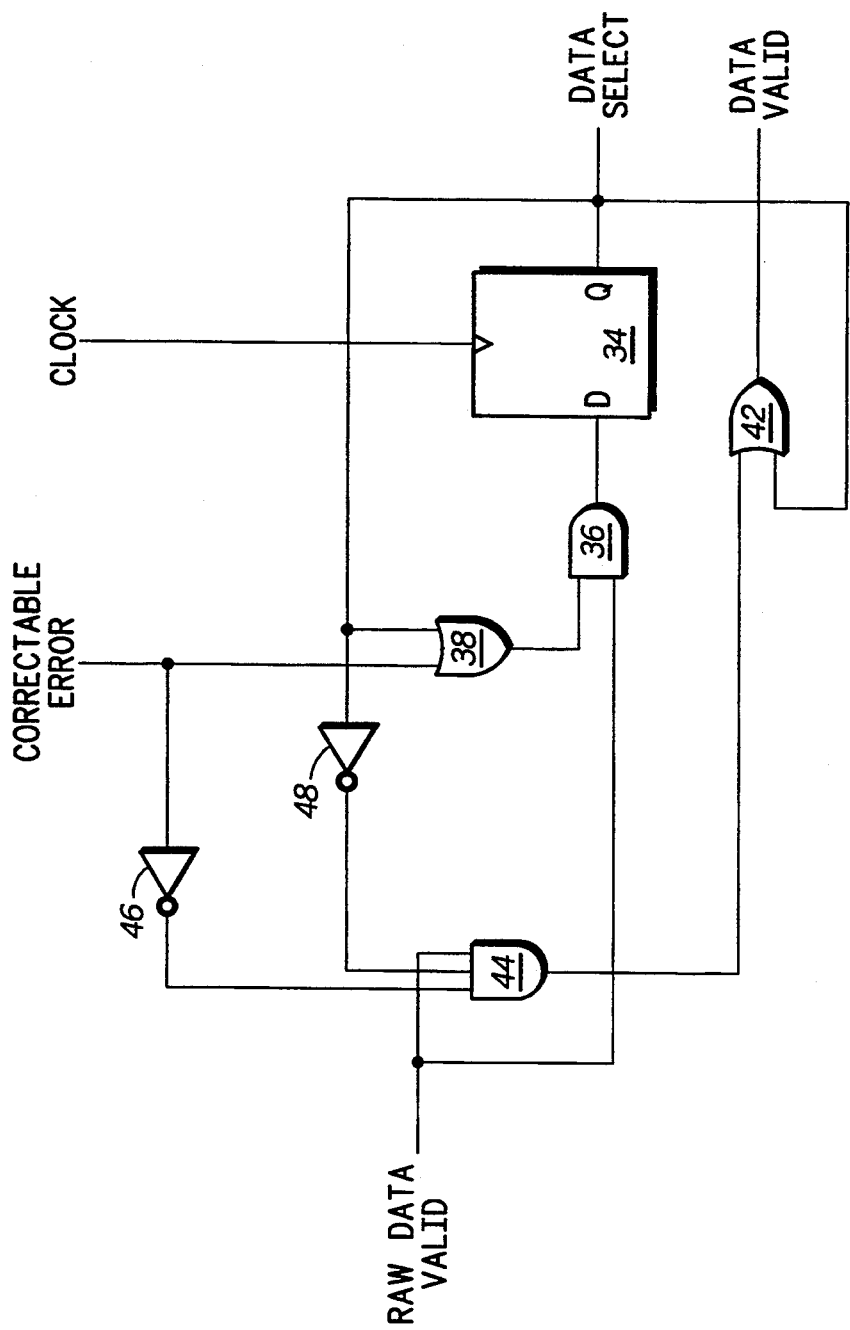
FIG. 3 depicts a logic diagram of the control block depicted in FIG. 2.

FIG. 3 depicts a logic diagram of control block 32 depicted in FIG. 2. As describe above, control block 32 generates the data select signal and the output data valid signal.

A data output of a flip-flop 32 (labeled Q) generates the data select signal. The signal CLOCK is connected to a clock input of flip-flop 34 (labeled V). A data input of flip-flop 34 (labeled D) is connected to an output of an AND gate 36. A first input of AND gate 36 receives the input data valid signal, RAW DATA VALID. A second input of AND gate 36 is connected to an output of an OR gate 38. A first input of OR gate 38 is connected to the data output of flip-flop 34. A second input of OR gate 38 receives the signal CORRECTABLE ERROR.

An output of an OR gate 42 generates the output data valid signal (labeled DATA VALID). A first input of OR gate 42 is connected to the data output of a flip-flop 34. A second input of OR gate 42 is connected to an output of a three-input AND gate 44. A first input of AND gate 44 is connected to an output of an inverter 46. An input of inverter 46 receives the signal CORRECTABLE ERROR. A second input of AND gate 44 is connected to an output of an inverter 48. An input of inverter 48 is connected to the data output of flip-flop 34. A third input of AND gate 44 receives the input data valid signal (labeled RAW DATA VALID).

Figure 4:
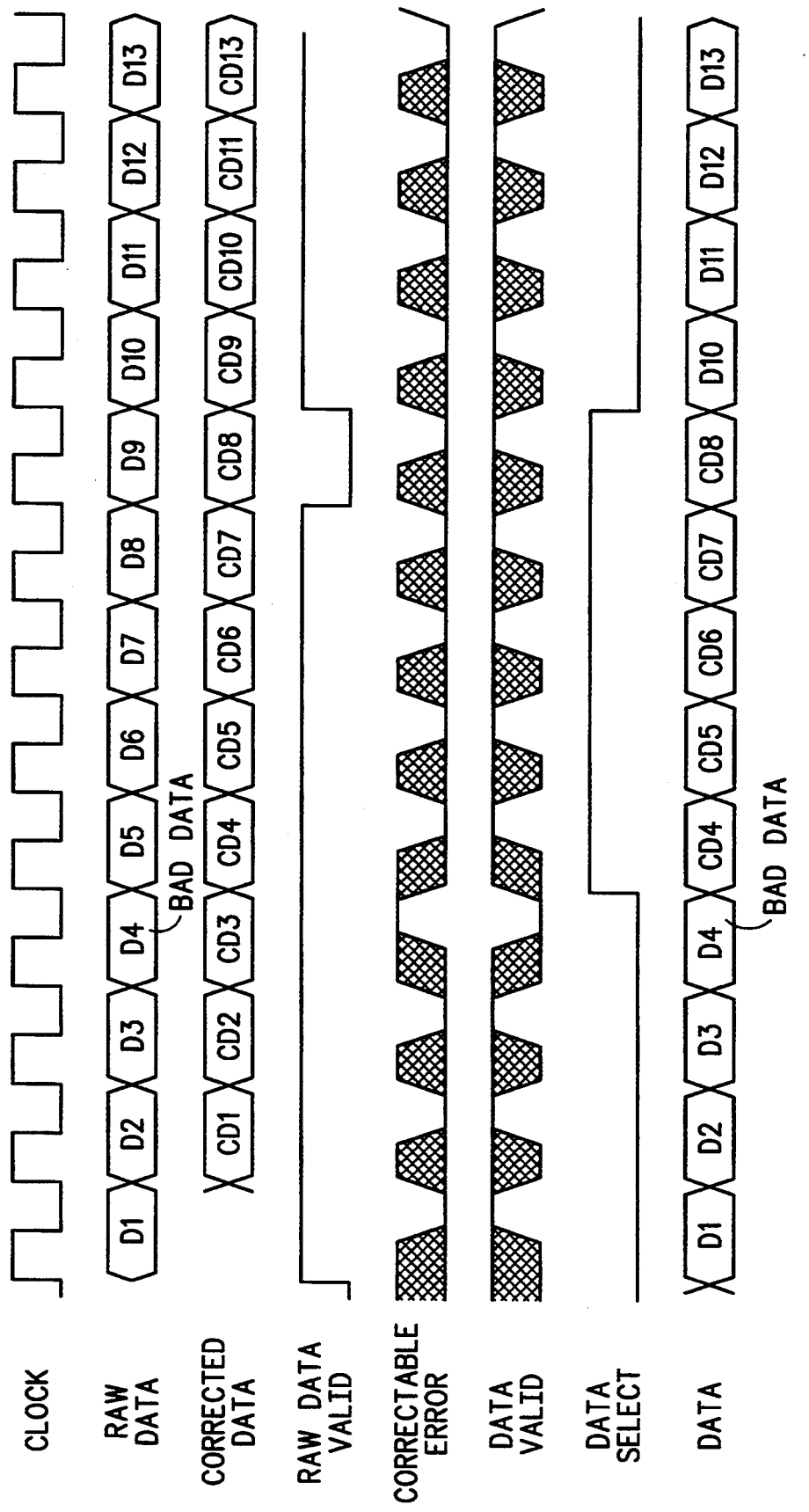
FIG. 4 depicts a timing diagram of the portion of the memory management unit depicted in FIG. 2.

FIG. 4 depicts a timing diagram of the portion of memory management unit 22 depicted in FIG. 2. FIG. 4 depicts the periodic clock signal CLOCK with respect to the signals described above: RAW DATA, CORRECTED DATA, RAW DATA VALID, CORRECTABLE ERROR, DATA VALID, DATA SELECT, and DATA. In the depicted example, MMU 22 requests a plurality of data symbols from a memory storage system (not shown). MMU 22 receives a different one of the plurality of data symbols during a different one of a plurality of sequential cycles of the signal CLOCK. In this example, MMU 22 receives N-bit symbols (labeled D1 through D13 ).during thirteen sequential cycles of the signal CLOCK. ECC decode block 28 generates twelve N-bit symbols (labeled CD1 through CD12) from the received symbols as described above. ECC decode block 28 generates the Ith corrected symbol one clock cycle after MMU 22 receives the Ith input symbol, where I is an integer index. For purposes of illustrating the disclosed invention, the fourth input symbol will contain a correctable error.

Prior to the first clock cycle, the input data valid signal (labeled RAW DATA VALID) is asserted and is asserted as long as the memory storage system forwards data to MMU 22. This assertion causes control block to initially select the RAW DATA data stream.

During the first three cycles of the signal CLOCK, MMU 22 receives the three data symbols D1 through D3. These three symbols are correct in this example. Therefore, ECC decode block 28 does not assert the signal CORRECTABLE ERROR. (In the disclosed embodiment, the signals CORRECTABLE ERROR and DATA VALID are evaluated towards the end of the second phase of each clock cycle. The logic states of the two signals may vary until then without impact. The cross-hatched portions of these two signals reflect these timing constraints.) ECC decode block 28 generates two symbols, CD1 and CD2, during the second and third clock cycles, respectively. The symbols D1 and CD1 are identical as are the symbols D2 and CD2. (The symbol CD3 generated in the fourth cycle will also be identical to the symbol D3.) Control block 32 and multiplexer 30 continue to select the RAW DATA data stream. This selection is reflected by the symmetry between the RAW DATA signal and the DATA signal during the first three clock cycles. Control block 32 also asserts the DATA VALID signal.

During the fourth cycle of the signal CLOCK, MMU 22 receives a fourth data symbol, D4. The fourth data symbol contains a correctable error in this example. Therefore, ECC decode block 28 asserts the signal CORRECTABLE ERROR and control block 32 de-asserts the signal DATA VALID.

During the fifth cycle of the signal CLOCK, MMU 22 receives a fifth data symbol, D5. The correctable error in the previous cycle causes control block 32 to select the CORRECTED DATA data stream beginning with the fifth cycle. This selection outputs the corrected fourth symbol and is reflected by the symmetry between the CORRECTED DATA signal and the DATA signal during this clock cycle. Control block 32 also re-asserts the DATA VALID signal during the fifth clock cycle indicating that the output symbol is correct.

During the sixth, seventh and eighth cycles of the signal CLOCK, MMU 22 receives the three data symbols D6 through D8. These three symbols are correct in this example. However, MMU 22 has not output the fifth symbol, D5. Therefore, control block 32 continues to select the CORRECTED DATA data stream. The CORRECTED DATA data stream contains the fifth symbol. (The symbol CD5 is identical to the omitted symbol D5.). Control block 32 continues to select the CORRECTED DATA stream to avoid omitting any other symbols. This selection is reflected by the symmetry between the CORRECTED DATA signal and the DATA signal during the sixth through eighth clock cycles. Control block 32 also asserts the DATA VALID signal.

At the end of the eighth clock cycle, the input data valid signal is de-asserted indicating the end of the read operation. At this point it is no longer critical that control unit 32 omit or not omit any symbols. Therefore, control unit 32 re-selects the RAW DATA data stream beginning with the ninth clock cycle. This step prepares MMU 22 for the next memory read operation. It need only be done before the next such operation. Typically, the memory storage system would not continue to send symbols to MMU 22 after the end of a read operation. However, for purposes of illustrating the disclosed invention, the memory storage system continues to forward the tenth through thirteenth symbols to MMU 22. As described above, control block 32 selects the RAW DATA data stream once it is reset by the data valid signal. This selection is reflected by the symmetry between the RAW DATA signal and the DATA signal during the tenth through thirteenth clock cycles. Multiplexer 30 outputs the eighth corrected symbol (labeled CD8) during the ninth clock cycle because control block 32 latches the transition from corrected data to raw data is latched for one clock cycle.

Although the present invention has been described with reference to a specific embodiment, further modifications and improvements will occur to those skilled in the art. For instance, ECC decode block 32 may be implemented with any one of several known ECC protocols. Also, the RAW DATA and DATA data streams may, respectively, receive data and forward data to different types of digital processing systems. It is to be understood therefore, that the invention encompasses all such modifications that do not depart from the spirit and scope of the invention as defined in the appended claims.

What is claimed is:

1. A circuit for use with a data processing system comprising:

error correcting code circuitry receiving a first data stream from a first agent, the error correcting code circuitry generating a second data stream and a correctable error signal, the second data stream generated responsive to the first data stream and to an error correcting code protocol, the error correcting code circuitry asserting the correctable error signal responsive to an error in the first data stream;

control circuitry receiving the correctable error signal from the error correcting code circuitry and a raw data valid signal from the first agent, the control circuitry generating a data valid signal output to a second agent and a select signal, the control circuitry asserting the data valid signal responsive to the assertion of the raw data valid signal and to a de-assertion of the correctable error signal, the control circuitry asserting the select signal responsive to a first assertion of the correctable error signal and the assertion of the raw data valid signal, the control circuitry de-asserting the select signal responsive to a first de-assertion of the raw data valid signal; and switching circuitry receiving the select signal, the first data stream and the second data stream, the switching circuitry outputting the first data stream to the second agent responsive to the de-assertion of the select signal, the switching circuitry outputting the second data stream to the second agent responsive to the assertion of the select signal.

2. A method of transferring error correcting code comprising the steps of:

receiving a first data stream and a raw data signal in a data processing system from a first agent;

selecting the first data stream as an output data stream to a second agent;

asserting a data valid signal to the second agent indicating the validity of the output data stream;

generating a second data stream from the first data stream pursuant to an error correcting code protocol;

generating a correctable error signal responsive to the generating a second data stream step;

de-asserting the data valid signal indicating the invalidity of the output data stream;

selecting the second data stream as the output data stream to the second agent responsive to a first predetermined transition of the correctable error signal; and asserting the data valid signal.

3. The method of claim 1 further comprising the step of re-selecting the first data stream as the output data stream responsive to a de-assertion of a raw data valid signal.

* * * * *